US012222630B2

(12) United States Patent
Washio

(10) Patent No.: US 12,222,630 B2
(45) Date of Patent: Feb. 11, 2025

(54) LENS DRIVING DEVICE, CAMERA DEVICE AND ELECTRONIC APPARATUS

(71) Applicant: New Shicoh Motor Co., LTD, Zhejiang (CN)

(72) Inventor: Noriyuki Washio, Yamato (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 534 days.

(21) Appl. No.: 17/564,918

(22) Filed: Dec. 29, 2021

(65) Prior Publication Data

US 2022/0206365 A1 Jun. 30, 2022

(30) Foreign Application Priority Data

Dec. 29, 2020 (CN) .......................... 202011605860.X

(51) Int. Cl.
*G03B 13/36* (2021.01)
*G02B 27/64* (2006.01)
*G03B 5/00* (2021.01)

(52) U.S. Cl.
CPC ........... *G03B 13/36* (2013.01); *G02B 27/646* (2013.01); *G03B 5/00* (2013.01); *G03B 2205/0007* (2013.01); *G03B 2205/0069* (2013.01)

(58) Field of Classification Search
CPC .. G03B 13/36; G03B 5/00; G03B 2205/0007; G03B 2205/0069; G02B 27/646
USPC .......................................................... 359/557
See application file for complete search history.

(56) References Cited

U.S. PATENT DOCUMENTS

2019/0101771 A1* 4/2019 Takimoto ............... G03B 13/36
2019/0353921 A1* 11/2019 Otomo ..................... G02B 7/08

FOREIGN PATENT DOCUMENTS

| JP | 2016020939 A | 2/2016 |
| JP | 2019066568 A | 4/2019 |
| JP | 2019-139223 A | 8/2019 |

* cited by examiner

Primary Examiner — Stephone B Allen
Assistant Examiner — Boutsikaris Leonidas
(74) Attorney, Agent, or Firm — Hayes Soloway P.C.

(57) ABSTRACT

A lens driving device is described that includes a base in which metal members are embedded, a circuit board arranged on the base, and suspension wires electrically connected to driving sources for moving the lens body with respect to the base. The metal members are electrically joined and fixed to the circuit board and the suspension wires at positions different from each other when viewed from an up-down direction.

9 Claims, 8 Drawing Sheets

LENS DRIVING DEVICE, CAMERA DEVICE AND ELECTRONIC APPARATUS

CROSS-REFERENCE TO RELATED APPLICATIONS

This application claims priority to Chinese Patent Application No. 202011605860.X filed Dec. 29, 2020, which is hereby incorporated by reference herein in its entirety.

TECHNICAL FIELD

The present disclosure relates to a lens driving device used in an electronic apparatus such as a smartphone, a camera device, and other types of electronic apparatuses.

BACKGROUND

Some lens driving devices among the lens driving device that have both OIS (Optical Image Stabilizer) function and AF (Auto Focus) function are called periscopic type. In a periscopic lens driving device, a lens body and an image sensor are arranged side by side in a direction orthogonal to the incident direction of light from a subject, and the light from the subject is reflected by a prism or a mirror, transmitted through the lens body, focused on the image sensor, and converted into an image signal by the image sensor. As a document disclosing a technique related to this type of lens driving device, Japanese Patent Application Laid-Open No. 2019-139223A (hereinafter referred to as Patent Document 1) can be given. The lens driving device disclosed in Patent Document 1 has a fixed portion, a movable portion, an elastic element, and suspension wires. The fixed portion has a housing, a base, a frame, and a circuit board. The movable portion has a carrier. The circuit board sends an electrical signal to control a driving assembly, and performs an OIS function and an AF function.

SUMMARY

In the lens driving device disclosed in Patent Document 1, a circuit board is arranged on a base, suspension wires were provided to penetrate both the base and the circuit board, and the suspension wires were soldered to the circuit board from the lower side of the base, supported by and electrically connected to the circuit board. However, in such a configuration, the circuit board was a component made of resin, and there was a problem that it was difficult to obtain stable supporting characteristics of the suspension wires.

The present disclosure has been made in view of such a problem, and the present disclosure aims to provide a lens driving device capable of obtaining stable supporting characteristics of the suspension wires even if the suspension wires are electrically connected to the circuit board.

In order to solve the above-described mentioned problem, in accordance with a first aspect of the present disclosure, there is provided a lens driving device including: a base in which metal members are embedded; a circuit board arranged on the base; and suspension wires electrically connected to driving sources for moving the lens body with respect to the base, wherein the metal members are electrically joined and fixed to the circuit board and the suspension wires at positions different from each other when viewed from an up-down direction.

In accordance with a second aspect of the present disclosure, there is provided a camera device including the lens driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
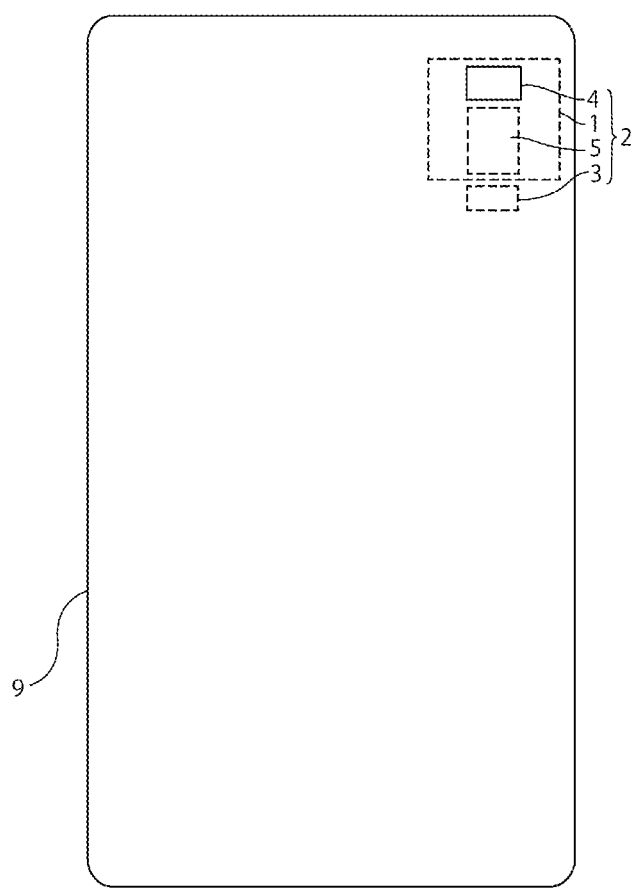
FIG. 1 is a front view of a smartphone on which a camera device including a lens driving device according to one embodiment of the present disclosure is mounted.

Hereinafter, embodiments of the present disclosure are explained with reference to drawings. As shown in FIG. 1, a camera device 2 including a lens driving device 1 according to one embodiment of the present disclosure is accommodated in a smartphone 9.

The camera device 2 has an image sensor 3, a mirror 4 that reflects light from a subject, a lens body 5 that guides the light reflected by the mirror 4 to the image sensor 3, and a lens driving device 1 that drives the lens body 5.

Hereinafter, as shown in FIGS. 2 through 8, a direction in which the light from the subject is incident is appropriately referred to as a Y direction. Further, one direction in which the light reflected by the mirror 4 is directed toward the lens body 5 is referred to as an X direction, and a direction orthogonal to the Y direction and the X direction is referred to as a Z direction. Further, the +Y side may be referred to as an upper side, the −Y side may be referred to as a lower side, the +X side may be referred to as a rear side, the −X side may be referred to as a front side, the +Z side may be referred to as a left side, and the −Z side may be referred to as a right side.

Figure 3:
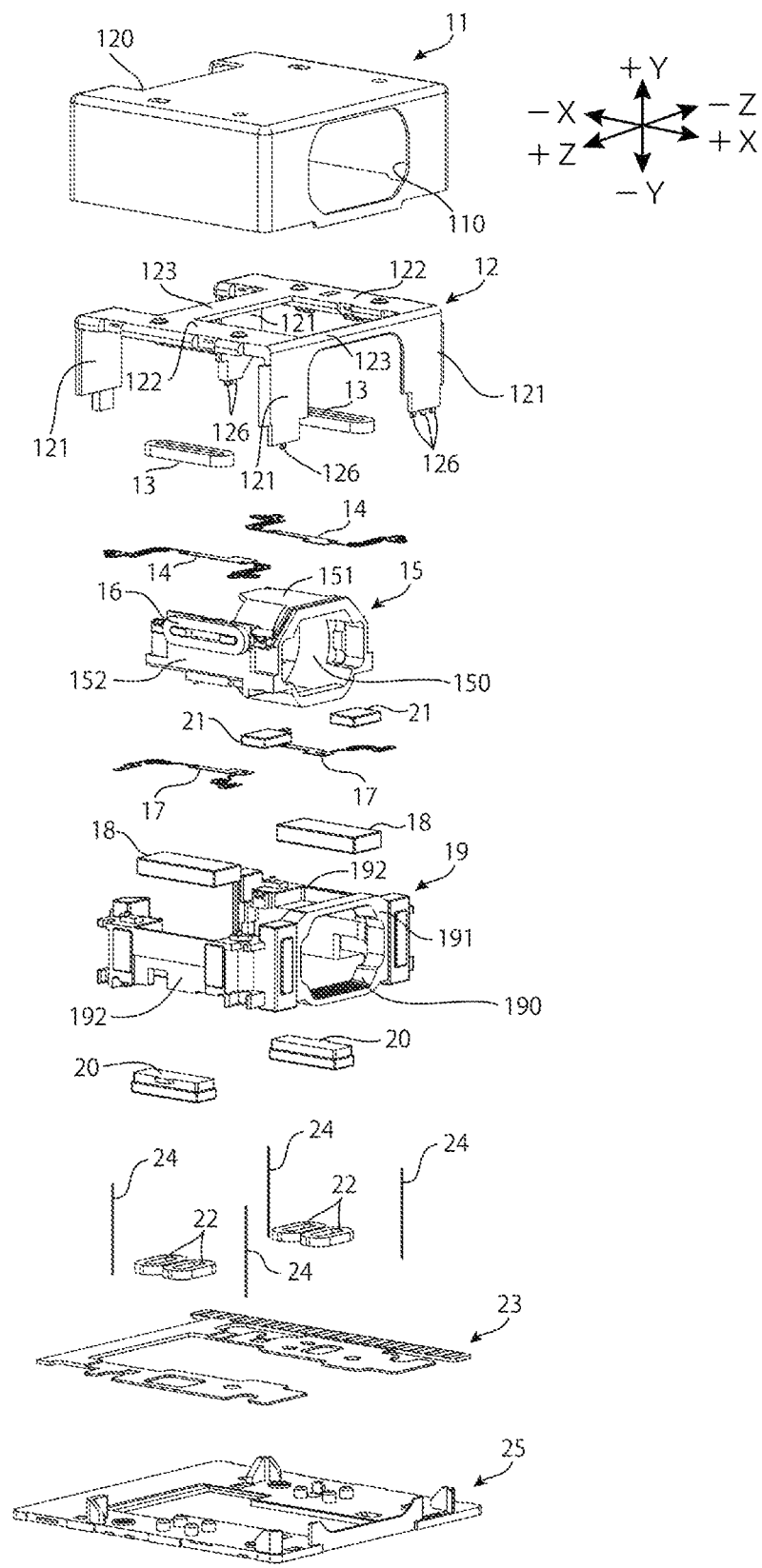
FIG. 3 is an exploded perspective view of the lens driving device shown in FIG. 2.

As shown in FIG. 3, the lens driving device 1 has a case 11, a frame 12, first coils for OIS (Optical Image Stabilizer) 13, upper side leaf springs 14, a carrier 15, second coils for OIS (Optical Image Stabilizer) 16, lower side leaf springs 17, magnets for OIS (Optical Image Stabilizer) 18, a holder 19, magnets for AF (Auto Focus) 20, magnets for detection 21, coils for AF (Auto Focus) 22, an FPC (flexible printed circuit board) 23, suspension wires 24, and a base 25. Among these, the carrier 15, the second coils for OIS 16, and the magnets for detection 21 constitute a movable portion. In addition, the magnets for OIS 18, the holder 19, and the magnets for AF 20 constitute an intermediate member. In addition, the case 11, the frame 12, the first coils for OIS 13, the coils for AF 22, the FPC 23, and the base 25 constitute a fixed portion.

The movable portion is supported by the holder 19 of the intermediate member via the upper side leaf springs 14 and the lower side leaf springs 17. The movable portion is movable in the Y direction with respect to the intermediate member. The intermediate member is supported by the base 25 of the fixed portion via the suspension wires 24. The intermediate member together with the movable portion supported by the intermediate member can move in the X direction and the Z direction with respect to the fixed portion. Hereby, the movable portion is movable in the X direction, the Y direction and the Z direction with respect to the fixed portion. In addition, the first coils for OIS 13, the second coils for OIS 16, the magnets for OIS 18, the magnets for AF 20, and the coils for AF 22 are driving sources 27 for moving the lens body 5 with respect to the base 25.

Figure 2:
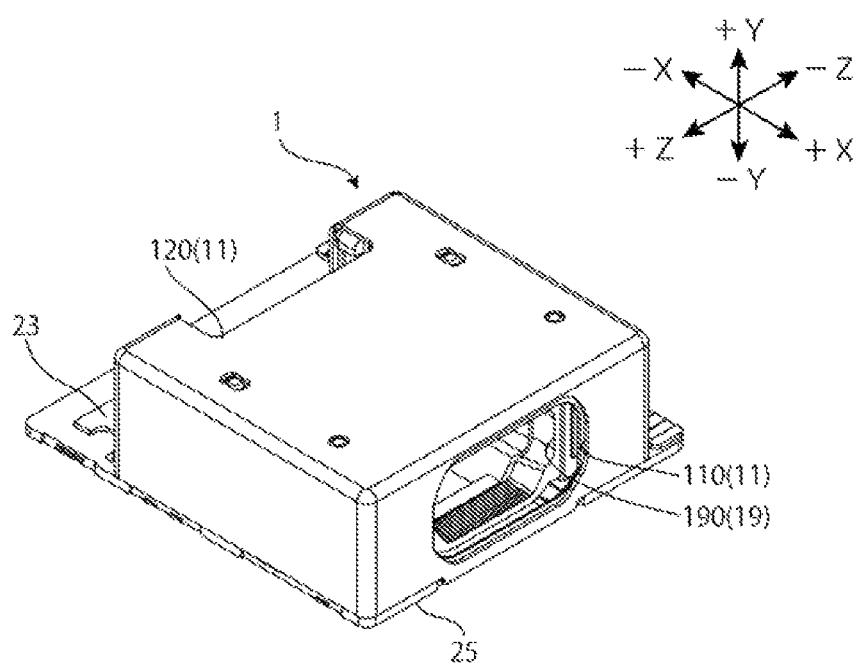
FIG. 2 is a perspective view of the lens driving device shown in FIG. 1.

As shown in FIG. 2, the case 11 and the base 25 are combined as a housing. A first opening 110 is provided in the center of the rear side wall of the case 11. A second opening 120 is provided in a portion ranging from the center of the front side wall to the upper side wall of the case 11.

Figure 6A:
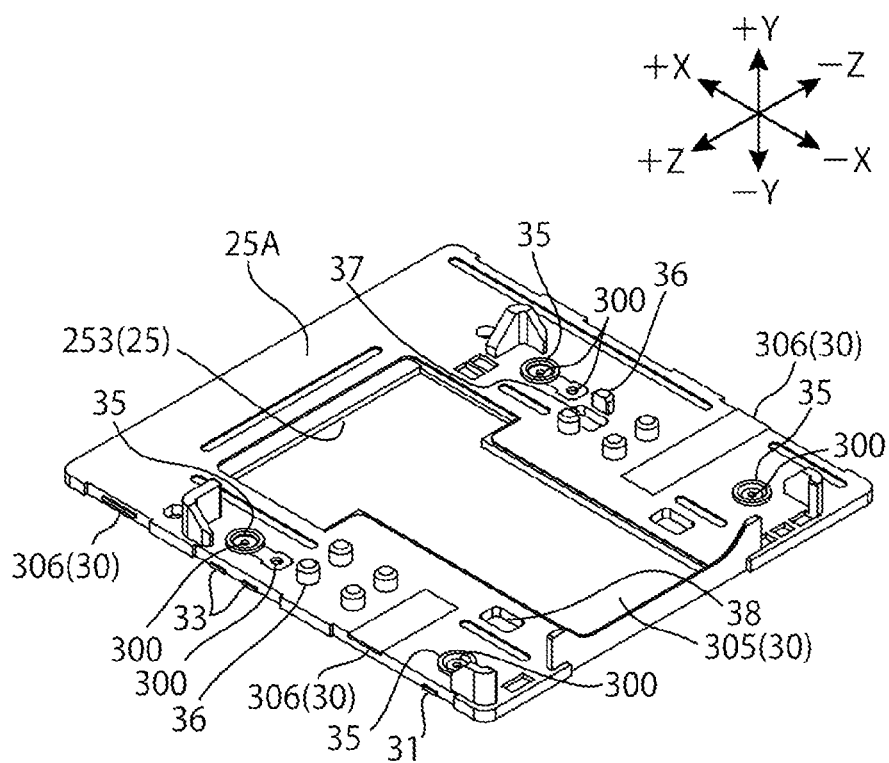
FIG. 6A is a perspective view showing a base shown in FIG. 4.

The base 25 is formed by molding the main body of the base 25 with resin in a state where the metal plate member 30, the first metal members 31, 33 are arranged in the resin, as shown in FIG. 6A. A rising portion 250 rising up to the upper side is provided at an edge on the rear side of the base 25. An FPC (flexible printed circuit board) 23, which is a flexible printed circuit board, is arranged on the base 25.

An opening portion 253 is provided in the center of the resin main body of the base 25 corresponding to the carrier 15. The opening portion 253 has a T-shape with an expanded front side. The metal plate member 30 is embedded in the resin main body so as to block the opening portion 253. A black layer is formed on the surface of the metal plate member 30.

Figure 6B:
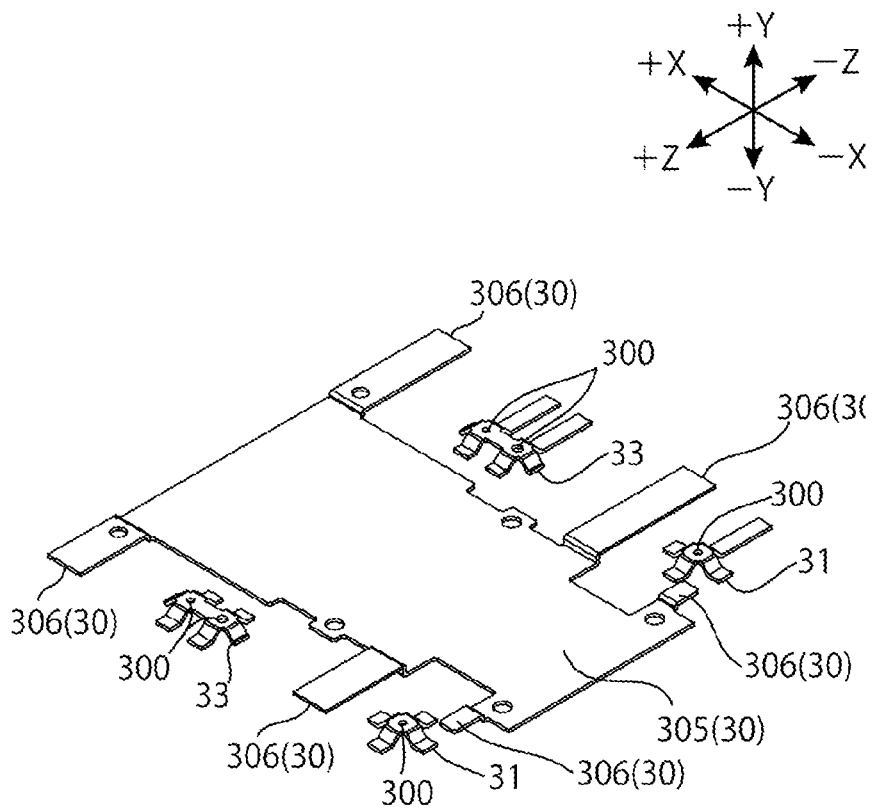
FIG. 6B is a perspective view showing a metal plate member and first metal members embedded in a resin main body of the base.

As shown in FIG. 6B, the first metal member 31 has a cross shape with four arm portions and a crossing portion. The first metal member 33 has six arm portions, one connection arm portion and two crossing portions, and has such a shape that two crosses are connected. The first metal member 31 is provided with one through hole 300 penetrating in the up-down direction at the crossing portion, and the first metal member 33 is provided with one through hole 300 penetrating in the up-down direction at each of the two crossing portions. Each of the arm portions around the through holes 300 of the first metal members 31, 33 is bent obliquely downward except for the connection arm portion, and each tip end portion is further bent so as to be horizontal. The connection arm portion is not bent.

As shown in FIG. 6A, the crossing portion of the first metal member 31 with one through hole 300 and the crossing portions of the first metal member 33 with two through holes 300 are exposed from the base 25 on both the upper and the lower surfaces. The tip end portions of the arm portions on the left side of the first metal members 31, 33 on the left side and the tip end portions of the arm portions on the right side of the first metal members 31, 33 on the right side are exposed from the base 25.

Damper gel receiving portions 35 are formed on the upper surface of the base 25, as shown in FIG. 6A. The receiving portions 35 are formed so as to surround the peripheries of the through holes 300 of the first metal members 31 and the peripheries of the through holes 300 on the front sides of the two through holes 300 of the first metal members 33 by walls, respectively. The damper gel is a resin with viscoelasticity and has the function of attenuating vibration.

Figure 7A:
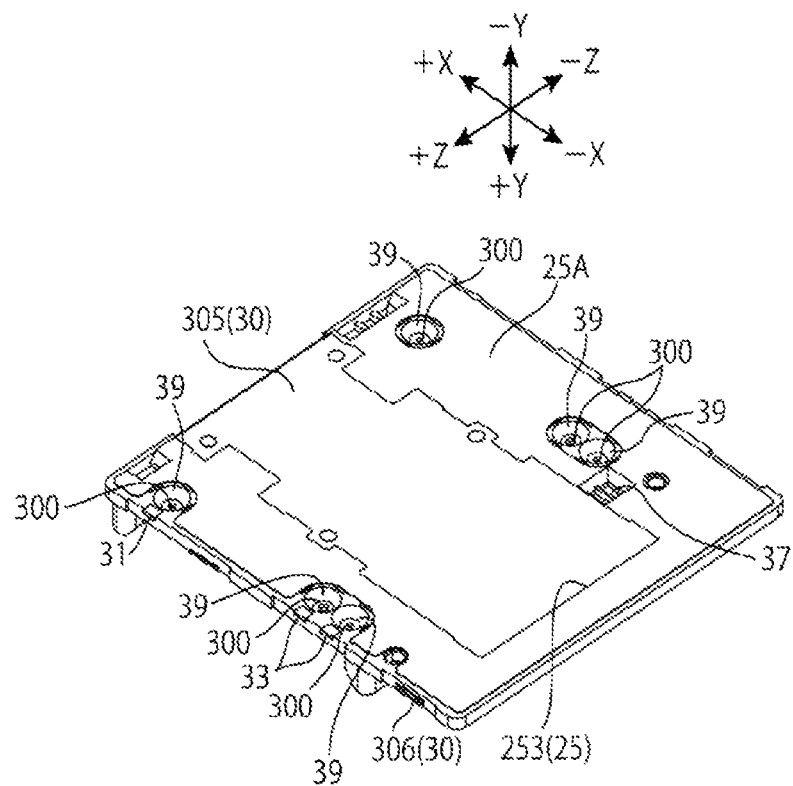
FIG. 7A is a perspective view showing base shown in FIG. 6A as viewed from the lower surface side.
Figure 7B:
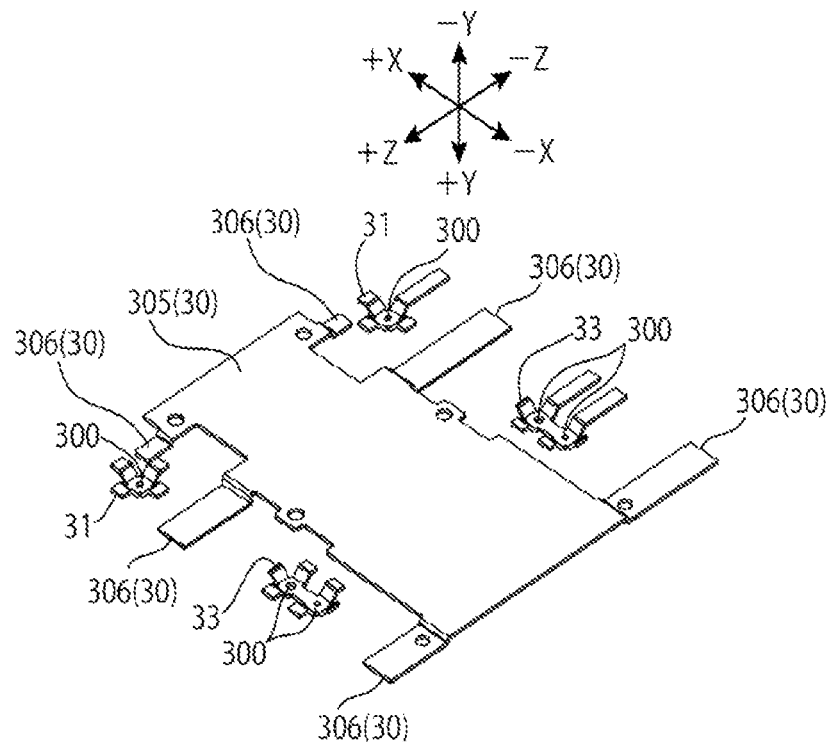
FIG. 7B is a perspective view showing the metal plate member and first metal members shown in FIG. 6B as viewed from the back surface side.

Solder accommodation cavities 39 are formed in the lower surface of the base 25, as shown in FIG. 7A. The accommodation cavities 39 are formed by being recessed in a truncated cone shape centered about the through holes 300 in the cavities formed by the first metal members 31 and 33. The first metal members 31, 33 are exposed on the upper surface and the lower surface at the area sandwiched by the receiving portions 35 and the accommodation cavities 39.

Figure 8:
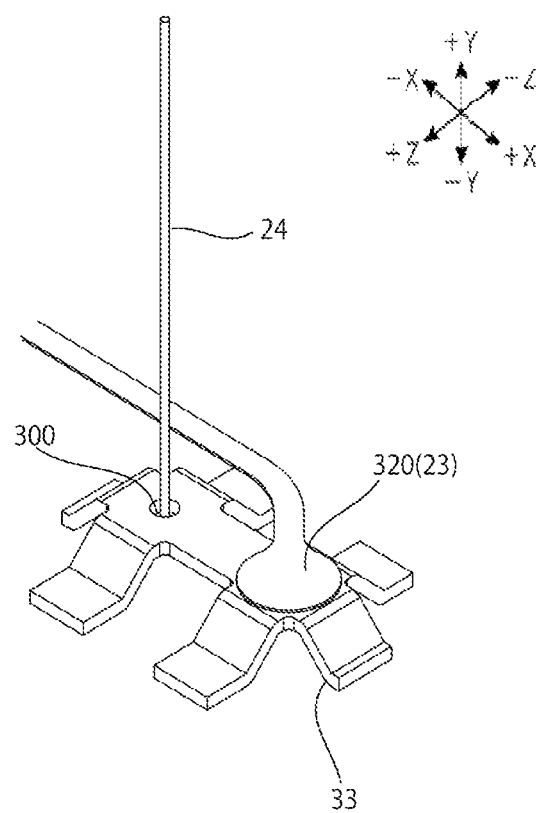
FIG. 8 is a partial enlarged perspective view showing the first metal member shown in FIG. 6A, a suspension wire and a pad of an FPC.

As shown in the partial enlarged view of FIG. 8, the lower ends of the suspension wires 24 are passed through the through holes 300 on the front sides of the first metal members 33 and the through holes 300 of the first metal members 31. The suspension wires 24 penetrate the base 25 and are soldered to the crossing portions on the front sides of the first metal members 33 and the crossing portions of the first metal members 31 from the lower surface by the solder of the accommodation cavities 39. The suspension wires 24 are thereby joined and fixed to the first metal members 31, 33 and are electrically connected to the first metal members 33.

The crossing portion on the rear side and the connection arm portion of the first metal member 33 are also exposed on the upper surface together with the crossing portion on the front end, and the crossing portion on the rear side of the first metal member 33 is also exposed on the upper surface and the lower surface. The FPC 23 is attached so as to cover the upper surface of the crossing portion on the rear side of the first metal member 33. As shown in FIG. 8, the electric connection pad 320 of the FPC 23 is placed on the upper surface side of the crossing portion on the rear side of the first metal member 33, and the first metal member 33 and the pad 320 are soldered to each other from the lower surface through the through hole 300. That is, the pad 320 is electrically joined and fixed to the first metal member 33.

A diameter of the through hole 300 of the first metal member 33 soldered to the pad 320 is larger than that of the through hole 300 through which the lower end of the suspension wire 24 is passed.

The pad 320 is connected to an external power source, whereby the external power source is electrically connected to the suspension wire 24 from the pad 320 via the first metal member 33. The suspension wire 24 is electrically connected to the second coil for OIS 16 via the upper side leaf spring 14.

A Hall element for X direction detection and a Hall element for Y direction detection as electric components are attached to the lower surface of the FPC 23. The base 25 is provided with an accommodation cavity 37 for accommodating the Hall element for X direction detection and an accommodation cavity 38 for accommodating the Hall element for Y direction detection. Convex portions 36 are provided on the left side and the right side of the upper surface of the base 25. The coil for AF 22 is wound around the convex portion 36 on the upper surface of the FPC 23.

As shown in FIG. 3, the frame 12 is formed by molding the main body of the frame 12 with resin in a state where the second metal members 126 are arranged in the resin. The end portions of the second metal members 126 protrude from the lower end portions of the frame 12. The second metal members 126 form electric wirings and serve both for reinforcing the frame 12 and for electric wiring. The lower end portions of the frame 12 are fixed to the base 25. The protruding end portions of the second metal members 126 are electrically connected to the FPC 23.

Figure 4:
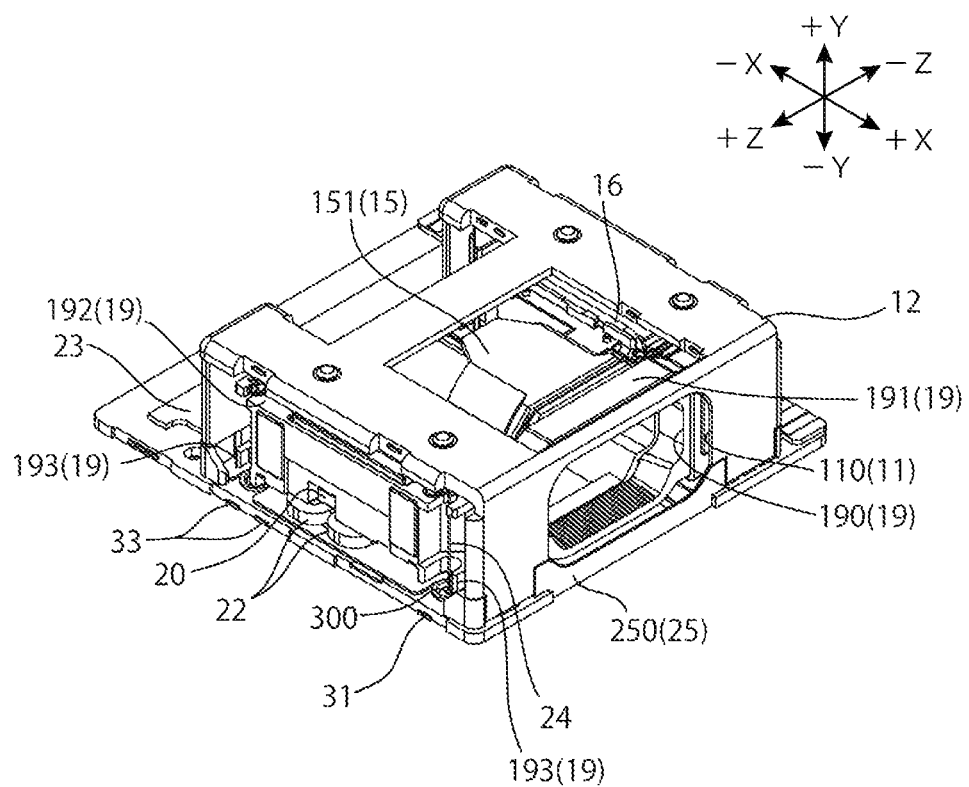
FIG. 4 is a perspective view in which the case is removed from the lens driving device shown in FIG. 2.

As shown in FIGS. 3 and 4, the frame 12 has two rising portions 121 rising up from the left side of the base 25, two rising portions 121 rising up from the right side of the base 25, left and right horizontal portions 122 connecting the two rising portions 121 on the left and right respectively, and connection portions 123 connecting the left and right horizontal portions 122. The two rising portions 121 oppose to each other in the optical axis direction. A first coil for OIS 13 and a Hall element for Z direction detection as electric components are provided on the lower surface of the horizontal portion 122 on the right side of the frame 12, and are electrically connected to the second metal member 126, respectively. A first coil for OIS 13 as an electric component is provided on the lower surface of the horizontal portion 122 on the left side of the frame 12, and is electrically connected to the second metal member 126.

Figure 5:
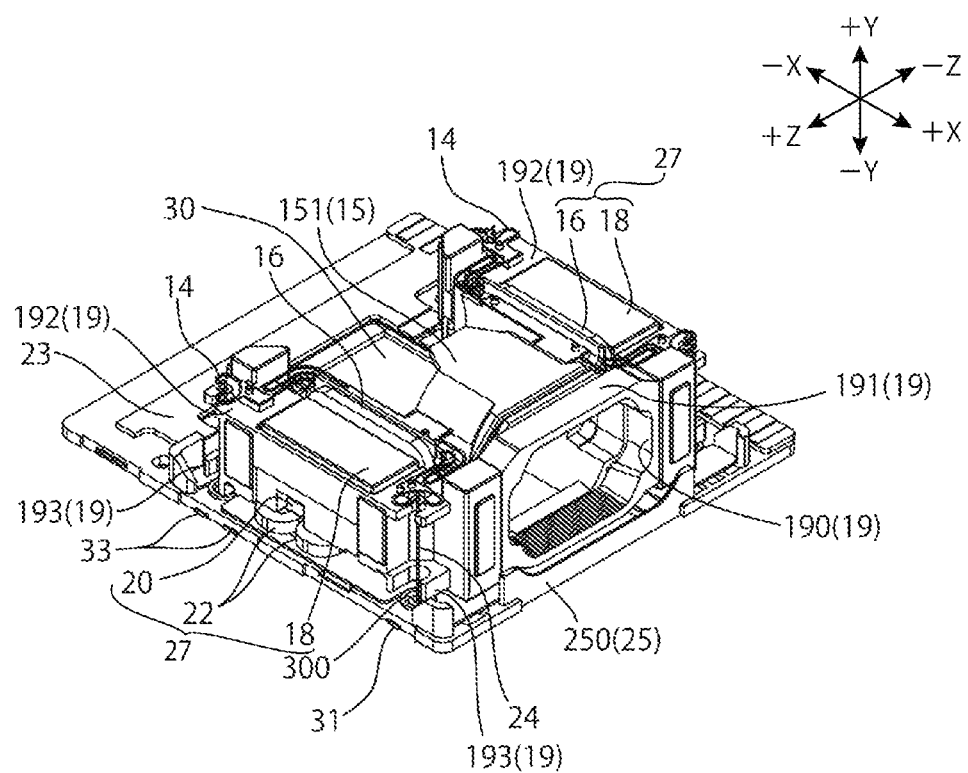
FIG. 5 is a perspective view in which the frame is removed from the lens driving device shown in FIG. 4.

As shown in FIG. 5, the holder 19 has a frame portion 191 surrounding the holder opening 190, and first wall portions 192 extending forward from the left and right peripheral portions of the frame portion 191. U-shaped recess portions 193 opened in the Z direction are provided at lower ends of the front, rear, left and right corner portions of the first wall portions 192. A magnet for OIS 18 is provided on the upper surface of the first wall portion 192. A magnet for AF 20 is provided on the lower surface of the first wall portion 192. The upper side leaf springs 14 are fixed to the upper surface of the holder 19, and the lower side leaf springs 17 are fixed to the lower surface of the holder 19. The upper side leaf springs 14 are formed in a wire shape extending while meandering inward from the front, rear, left and right on the upper side of the holder 19. The lower side leaf springs 17 are formed in a wire shape extending while meandering inward from the front, rear, left and right on the lower side of the holder 19.

As shown in FIG. 3, the carrier 15 is a lens supporting body that supports the lens body 5. The carrier 15 has a cylindrical body 151 and second wall portions 152 extending forward from the peripheral edge portions on the left side and the right side of the cylindrical body 151. The second wall portions 152 are formed by cutting off the upper side portion and the lower side portion at the front portion of the cylindrical body 151. A through hole 150 is provided in the cylindrical body 151. The through hole 150 and an inner edge forming the through hole 150 are an attachment portion of the lens body 5. After the lens driving device 1 is completed, the lens body 5 is fitted into the through hole 150 from between the left and the right second wall portions 152 of the carrier 15 and attached to the carrier 15. The front, rear, left and right of the upper side of the carrier 15 are supported by the upper side leaf springs 14, and the front, rear, left and right of the lower side of the carrier 15 are supported by the lower side leaf springs 17. The gravity center of the movable portion including the lens body 5 and the carrier 15 that supports the lens body 5 is located approximately at the center of the front, rear, left and right upper side leaf springs 14 and the lower side leaf springs 17.

The second coils for OIS 16 are provided on the outer surfaces of the left and right second wall portions 152 of the carrier 15. The magnets for detection 21 are provided on the lower surface of the rear portion of the second wall portion 152. In addition, the connection portions 123 of the frame 12 are provided at portions where the upper portion of the cylindrical body 151 is cut off, and the cylindrical body 151 and the connection portions 123 overlap when viewed from the X direction.

The suspension wire 24 passes through the U-shaped recess portion 193 of the holder 19, and is bridged between the through hole 300 of the base 25 and the upper side leaf spring 14. The lower end of the suspension wire 24 is inserted into the through hole 300 of the base 25 and soldered to the through hole 300. The upper end of the suspension wire 24 is inserted into the tip end portion of the upper side leaf spring 14 and soldered to the tip end portion of the upper side leaf spring 14 which is formed in a ring shape on the outer side of the holder 19.

A damper gel is arranged between the lower end portion of the suspension wire 24 and the U-shaped recess portion 193 of the holder 19 and the receiving portion 35 of the base 25. The U-shaped recess portion 193 is provided at an interval directly above the receiving portion 35 and forms a damper gel reservoir together with the receiving portion 35.

The second coil for OIS 16 that constitutes the movable portion and the magnet for OIS 18 that constitutes the intermediate member face each other. When an electric current flows in the second coil for OIS 16, an electromagnetic force in the Y direction is generated in the second coil for OIS 16, and the movable portion moves in the Y direction with respect to the intermediate member. The Hall element for Y direction detection detects the magnetic field of the opposing magnet for detection 21 and outputs a signal indicating the detection result. This signal corresponds to the position of the magnet for detection 21 in the Y direction with respect to the Hall element for Y direction detection.

The magnet for OIS 18 that constitutes a part of the intermediate member and the first coil for OIS 13 that constitutes a part of the fixed portion face each other. When an electric current flows in the first coil for OIS 13, an electromagnetic force in the Z direction is generated in the first coil for OIS 13 and a reaction force is generated in the magnet for OIS 18. The intermediate member moves in the Z direction with respect to the fixed portion. The Hall element for Z direction detection detects the magnetic field of the opposing magnet for OIS 18 and outputs a signal indicating the detection result. This signal corresponds to the position of the magnet for OIS 18 in the Z direction with respect to the Hall element for Z direction detection.

The magnet for AF 20 that constitutes a part of the intermediate member and the coil for AF 22 that constitutes a part of the fixed portion face each other. When an electric current flows in the coil for AF 22, an electromagnetic force in the X direction is generated in the coil for AF 22, and a reaction force is generated in the magnet for AF 20. The intermediate member moves in the X direction with respect to the fixed portion. The Hall element for X direction detection detects the magnetic field of the opposing magnet for AF 20 and outputs a signal indicating the detection result. This signal corresponds to the position of the magnet for AF 20 in the X direction with respect to the Hall element for X direction detection.

The lens driving device 1 according to the present embodiment includes: a base 25 in which the first metal members 33 are embedded; an FPC 23, which is a flexible printed circuit board, arranged on the base 25; and suspension wires 24 electrically connected to the second coils for OIS 16, which is a part of the driving sources 27 for moving the lens body 5 with respect to the base 25. The first metal members 33 are electrically joined and fixed to the FPC 23 and the suspension wires 24 at positions different from each other when viewed from the up-down direction. Thus, the suspension wires 24 are electrically connected to the FPC 23 and fixed to the first metal members 33 embedded in the base 25, so that it is possible to provide a lens driving device 1 capable of obtaining stable supporting characteristics of the suspension wires 24.

It is to be noted that in the above embodiment, the first metal member 31 may have the same shape as that of the first metal member 33 with two through holes 300. In this case, the lower end of the suspension wire 24 may pass through and be soldered to one through hole 300 of the two through holes 300, and the other through hole 300 may not be used. In addition, it may also be used in a lens driving device in which the light from the subject is not reflected by a prism or a mirror.

In addition, the receiving portion 35 may be not provided on the base 25, and damper gel may be arranged between the U-shaped recess portion 193 of the holder 19 and the upper surface of the base 25.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens driving device comprising:
    a base in which a plurality of metal members are embedded;
    a flexible printed circuit board that is arranged on the base and is provided with electric connection pads connected to an external power source; and
    suspension wires electrically connected to driving sources for moving a lens body with respect to the base,
    wherein each of two metal members of the plurality of metal members is electrically joined and fixed to one of the electric connection pads of the circuit board and one of the suspension wires, which are at positions different from each other when viewed from an up-down direction.

2. The lens driving device according to claim 1, wherein:
    the each of two of the metal members comprise two through holes penetrating in the up-down direction,
    a lower end portion of the one of the suspension wires is inserted into one through hole of the two through holes, soldered and electrically joined and fixed to the metal member from a lower surface side, and
    the one of the electric connection pads of the flexible printed circuit board is soldered and electrically joined and fixed to the metal members from a lower surface side through the other through hole of the two through holes.

3. The lens driving device according to claim 2, wherein the other through hole is larger than the one through hole.

4. The lens driving device according to claim 2, wherein peripheries of the through holes in the metal member are bent downward to form solder accommodation cavities.

5. The lens driving device according to claim 4, wherein the accommodation cavities are each formed in a truncated cone shape centered about the through hole.

6. The lens driving device according to claim 1, further comprising:
    a carrier with an attachment portion for attaching the lens body;
    coils as the driving sources attached to the carrier; and
    leaf springs electrically connected to the suspension wires and the coils.

7. The lens driving device according to claim 1, wherein electric components are attached to a lower surface of the circuit board, and an accommodation cavity for the electric components is provided on the base.

8. A camera device comprising the lens driving device of claim 1.

9. An electronic apparatus comprising the camera device of claim 8.

* * * * *